United States Patent [19]

Abe

[11] Patent Number: 4,574,940

[45] Date of Patent: Mar. 11, 1986

[54] TIRE BEAD WIRE SUPPLY APPARATUS

[75] Inventor: Norio Abe, Higashimurayama, Japan

[73] Assignee: Bridgestone Tire Company Limited, Tokyo, Japan

[21] Appl. No.: 584,967

[22] Filed: Feb. 29, 1984

[30] Foreign Application Priority Data

Mar. 9, 1983 [JP] Japan .................................. 58-38651

[51] Int. Cl.$^4$ .............................................. B65G 39/00
[52] U.S. Cl. ................................ 198/468.6; 198/487.1
[58] Field of Search ............... 198/339, 342, 370, 477, 198/478, 482–485, 651, 678, 680, 796, 801, 802, 345

[56] References Cited

U.S. PATENT DOCUMENTS

| | | | |
|---|---|---|---|
| 2,709,512 | 5/1955 | Curtis | 198/342 |
| 3,115,964 | 12/1963 | Logan | 198/485 |
| 3,224,564 | 12/1965 | Kay | 198/796 |
| 3,240,356 | 3/1966 | Hill | 198/678 |
| 3,960,260 | 6/1976 | Azuma et al. | 198/345 |
| 4,072,227 | 2/1978 | Nomura et al. | 198/678 |
| 4,139,108 | 2/1979 | Kamp et al. | 198/485 |
| 4,306,646 | 12/1981 | Magni | 198/370 |

Primary Examiner—Joseph E. Valenza
Attorney, Agent, or Firm—Sughrue, Mion, Zinn, Macpeak, and Seas

[57] ABSTRACT

A tire bead wire supply apparatus for supplying bead wires for tires one to each of a plurality of treating means for the bead wires.

According to the invention the apparatus comprises holding means for holding a plurality of bead wires, driving means for moving the holding means so as to pass in immediate front of each of the treating means in succession and stopping the holding means at the immediate front of each of the treating means and transferring means for receiving each of the bead wires from the holding means stopped at the immediate front of each of the treating means and transferring it to the each of the treating means, thereby making the apparatus inexpensive and small-sized and operate with higher efficiency.

10 Claims, 13 Drawing Figures

FIG_3

FIG_6
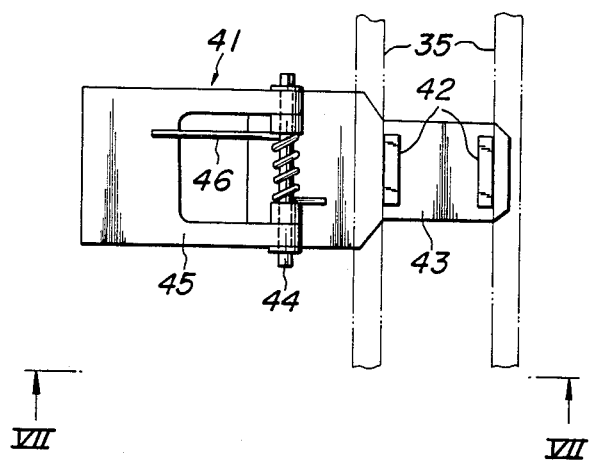
FIG_7
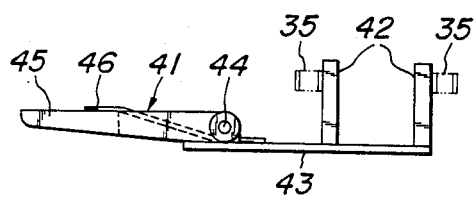

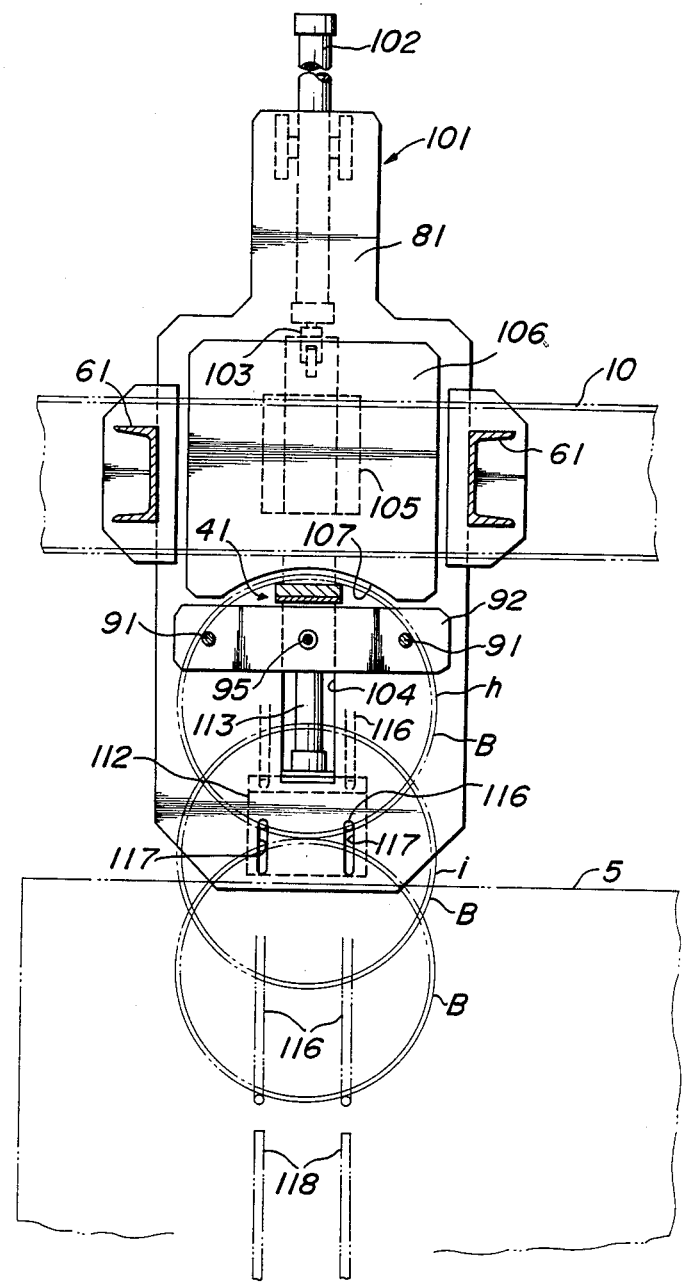
FIG_9

FIG_10
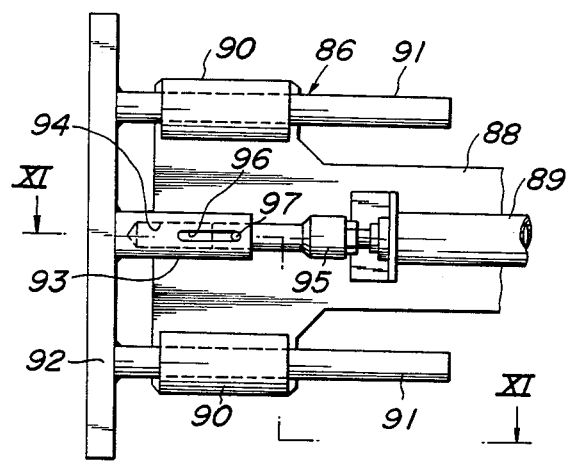
FIG_11
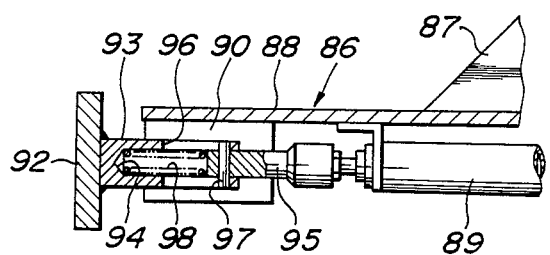

TIRE BEAD WIRE SUPPLY APPARATUS

BACKGROUND OF THE INVENTION

1. Field of the Invention:

This invention relates to an apparatus for supplying tire bead wires to each of a plurality of treating devices for the bead wires.

2. Description of the Prior Art:

A hitherto used tire bead wire supply apparatus has been known as, for example, disclosed in Japanese Patent Application Publication No. 37,512/77. The apparatus disclosed in the Publication comprises a first transferring device including an upward transferring mechanism for upward transferring tire bead wires supplied from a preceding process one by one and hung by this mechanism. A disengaging mechanism disengages the bead wire from the transferring mechanism at the same time when the transferring mechanism is stopped. A first transferring conveyor includes a mechanism for continuously transferring the bead wires fed from the first transferring device. A stopping mechanism temporarily keeps the bead wires in order to feed them to a next process, and a mechanism issued for positioning in gripped positions the bead wires supplied one by one from the above first transferring conveyor. A second transferring device mechanically grips the bead wires with their insides located in the gripped positions and transfers the gripped bead wires to a supply portion for a working treating machine.

On the other hand, it has recently be proposed to simultaneously operate a plurality of treating devices in order to improve the production efficiency. If the above tire bead wire supply apparatus is applied to such a plurality of treating devices, it is required to provide the same number of supply apparatus as that of the treating devices because the above supply apparatus can supply the bead wires only to one treating device. Accordingly, the whole apparatus including the plurality of supply apparatus has become large-sized to increase its initial cost of the plant and complicated in construction. With the above supply apparatus, moreover, the upward transferring mechanism and the second transferring device must be moved upward and downward every time when one bead wire is supplied and therefore the apparatus operates with lower working efficiency.

SUMMARY OF THE INVENTION

It is a primary object of the invention to provide an apparatus for supplying bead wires for tires, which eliminates all the disadvantages of the prior art apparatus and which is inexpensive and small-sized and operates with higher efficiency.

In order to achieve the above object, the apparatus for supplying bead wires for tires one to each of a plurality of treating means for the bead wires according to the invention comprises holding means for holding a plurality of bead wires, driving means for moving said holding means so as to pass in immediate front of each of said treating means in succession and stopping said holding means at said immediate front of each of said treating means and transferring means for receiving each of said bead wires from said holding means stopped at the immediate front of each of said treating means and transferring it to said each of said treating means.

The invention will be more fully understood by referring to the following detailed specification and claims taken in connection with the appended drawings.

BRIEF DESCRIPTION OF THE DRAWINGS

FIG. 6 is a plan view of holding means used in the apparatus shown in FIG. 1;

FIG. 7 is a side view of the holding means shown in FIG. 6 as viewed in a direction of arrows VII;

FIG. 9 is a sectional view as viewed in a direction shown by arrows IX in FIG. 8;

FIG. 10 is a bottom plan view illustrating the pushing mechanism used in the apparatus as viewed in a direction shown by arrows X;

FIG. 11 is a sectional view of the pushing mechanism taken along the line XI—XI in FIG. 10;

DETAILED DESCRIPTION OF THE PREFERRED EMBODIMENT

Figure 1:
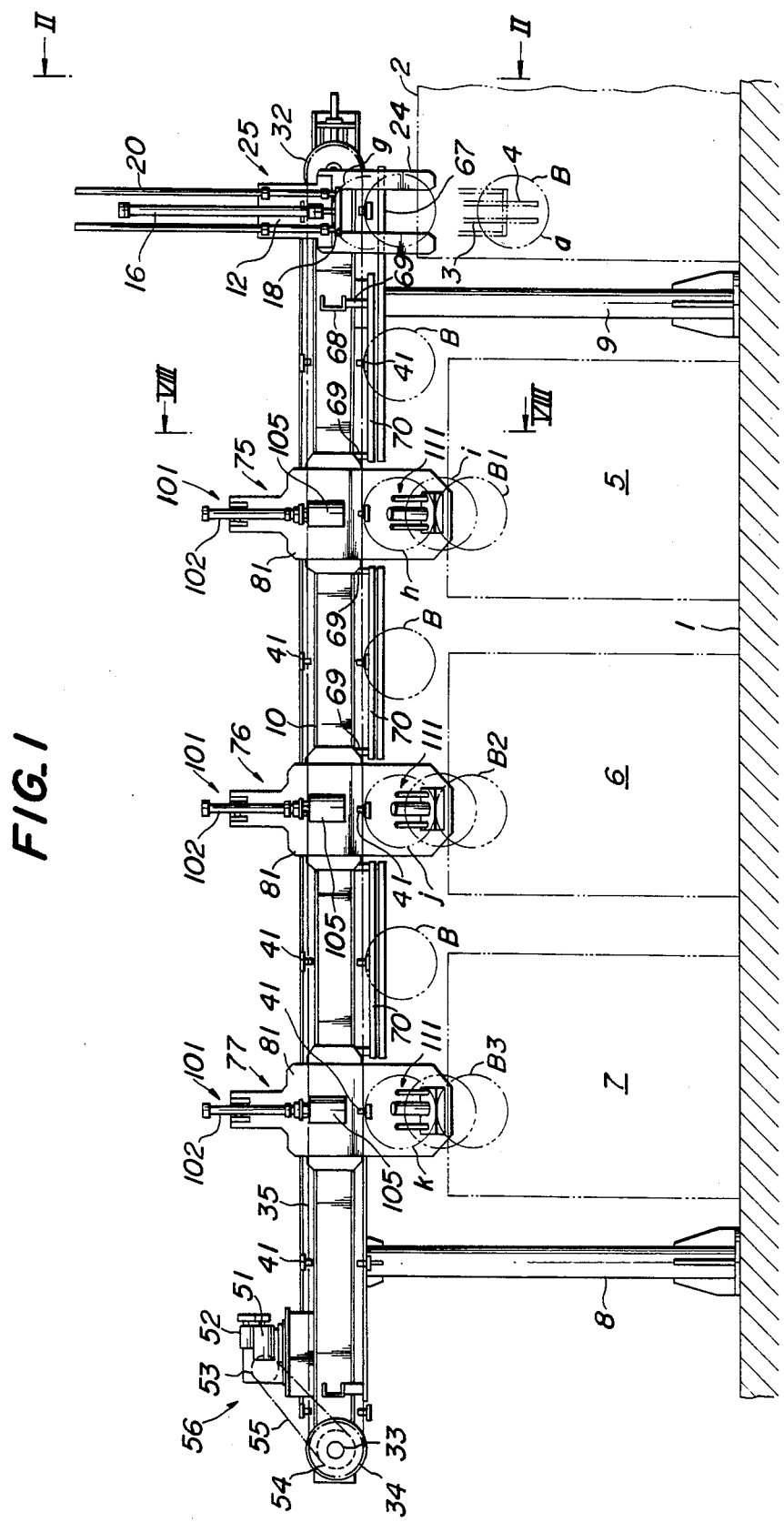
FIG. 1 is a schematic front elevation of the apparatus of one embodiment of the invention.
Figure 2:
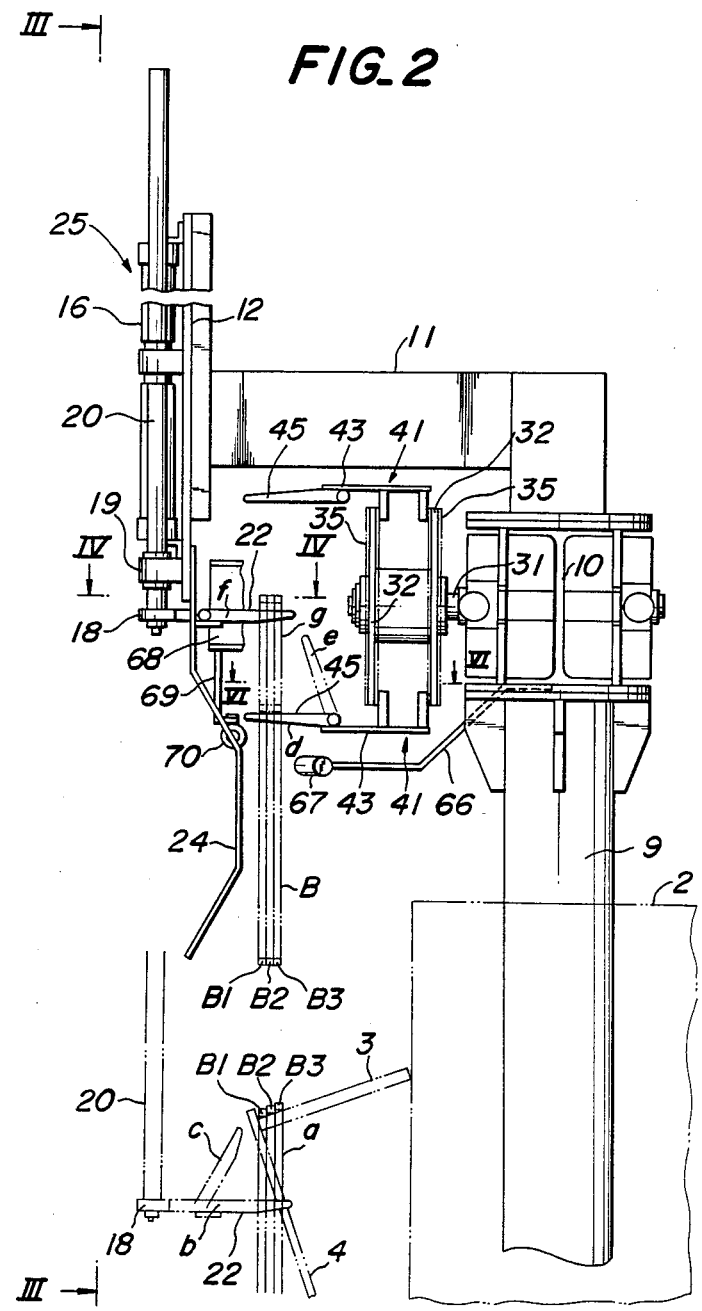
FIG. 2 is a side view of the apparatus in FIG. 1 as viewed in a direction shown by arrows II.
Figure 3:
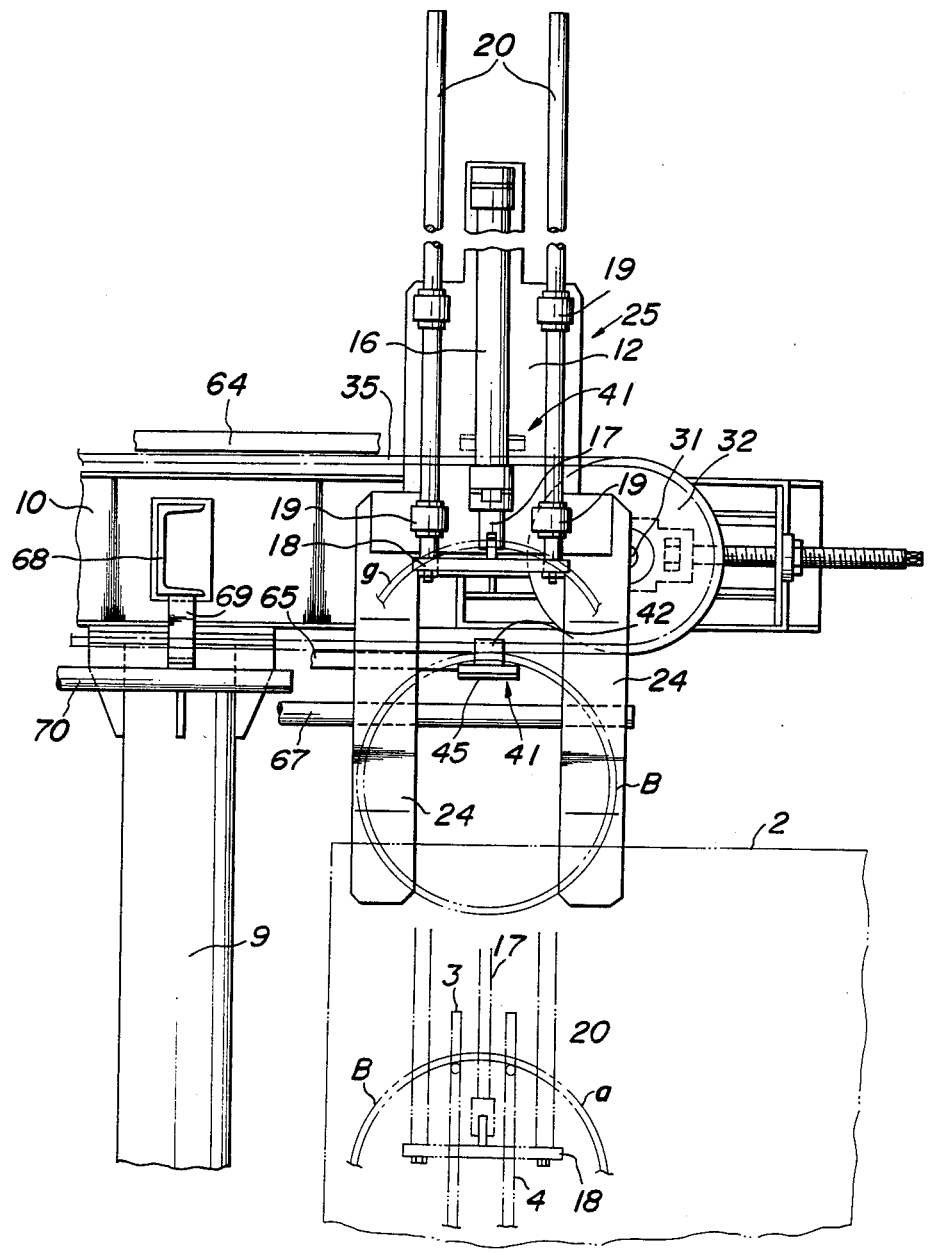
FIG. 3 is a partial front elevation of the apparatus in FIG. 1 as viewed in a direction shown by arrows III.

Referring to FIG. 1 illustrating one embodiment of the invention, on a floor 1 is arranged a forming device 2 for simultaneously forming a plurality (three in this embodiment) of bead wires B for tires, from which the bead wires are exhausted in their substantially vertical positions or with their axes being substantially horizontal. Each bead wire B thus formed consists for example of raw rubber rings and a plurality of annular bead wire elements embedded therein. As shown in FIGS. 2 and 3, the forming device 2 comprises at it's exit a pair of downward inclined guide rods 3, each provided with substantially vertical releasing bars 4 each having its upper end fixed to the guide rod 3 and slightly inclined so as to cause its lower end to be nearer to the forming device 2.

Referring back to FIG. 1, on the floor next to the forming device 2 are arranged first, second and third treating devices 5, 6 and 7 in a row, whose number is the same as that of the bead wires B simultaneously formed. Each of the first, second and third treating devices 5, 6 and 7 treats one bead wire B at one time, for example, covering. On the floor are uprightly arranged a pair of columns 8 and 9 to which at their upper ends is fixed a horizontal beam 10 extending immediately above the forming device 2 and the first, second and third treating devices 5, 6 and 7.

To the portion of the horizontal beam 10 immediately above the forming device 2 is fixed an L-shaped arm 11 having a front end to which is fixed a vertical mounting plate 12 immediately above the guide rods 3 as shown in FIG. 2. As shown in FIGS. 2 and 3, to the mounting plate 12 is vertically fixed a pneumatic cylinder 16 whose piston rod 17 has at its lower end a lift plate 18 shown in detail in FIGS. 4 and 5. Two guide blocks 19 are fixed to the mounting plate 12 on both sides of the pneumatic cylinder 16 and slidably carry a pair of guide bars 20 in parallel with the pneumatic cylinder 16. Lower ends of the guide bars 20 are fixed to the lift plate 18.

Figure 4:
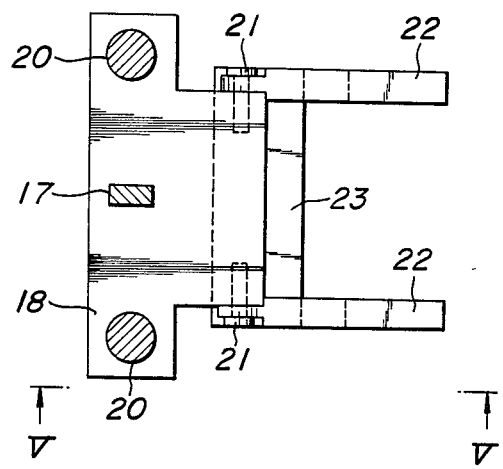
FIG. 4 is a partial sectional view taken along the line IV—IV in FIG. 2.
Figure 5:
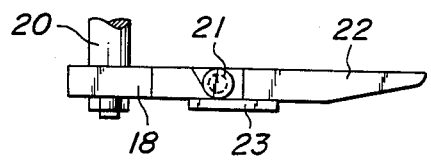
FIG. 5 is a side view of the finger shown in FIG. 4 as viewed in a direction of arrows V.

A pair of fingers 22 in parallel with each other are rotatably connected at their inner ends to the lift plates 18 by means of pairs 21 as shown in FIGS. 4 and 5. The lift plate 18 is provided at its underside with a stopper 23 fixed thereto for preventing the fingers 22 from downwardly rocking from their horizontal positions, so that the fingers 22 are rockable only upward from the horizontal positions and able to return to the horizontal positions by their self weight.

To a lower end of the mounting plate 12 is fixed a pair of steady plates 24 for preventing the bead wires B upwardly moving carried along the fingers 22 from wandering as shown in FIGS. 2 and 3.

The pneumatic cylinder 16, the guide bars 20, the lift plate 18, the fingers 22 and the stopper 23 constitute as a whole a carrying-out mechanism 25 which causes from the forming device 2 to holding means later described to raise the bead wires by means of the fingers which engage insides of the bead wires and are only upward rockable from the horizontal positions, thereby transferring the bead wires in a simple manner without damaging them.

On the horizontal beam 10 immediately above the forming device 2 is rotatably supported a horizontal rotary shaft 31 onto which a pair of driven sprockets 32 are mounted. Referring again to FIG. 1, on one end of the horizontal beam 10 opposite to the rotary shaft 31 is rotatably supported a rotary shaft 33 which is in parallel with the rotary shaft 31 and is provided with a pair of driving sprockets 34 fixed thereto. About the driving and driven sprockets 32 and 34 are trained a pair of chain conveyors 35 provided with a plurality of holding means 41 with an equal interval in a lengthwise direction of the chain conveyors (in this embodiment with the interval substantially equal to a center-to-center distance of the first, second and third treating devices 5, 6 and 7). As shown in FIGS. 2, 6 and 7, each the holding means 41 comprises a horizontal holding plate 43 secured through brackets 42 to the chain conveyor 35 and a finger 45 as a U-shaped holding member rockably supported on the holding plate 43 at a pin 44. When the finger 45 abuts with its underside against the holding plate 43, the finger 45 is prevented from further rocking downward, so that it is only rockable from its horizontal position toward the brackets 42. A spring 46 serves to return the finger 45 to its horizontal position. The finger 45 holds a plurality of bead wires supplied through the carrying-out mechanism 25 from the forming device 2 in a manner such that the bead wires B are hung with their insides engaging the finger 45 and concentric to each other. Since the plurality of the bead wires B are held in concentric positions or in axially aligned with each other by the finger 45, the held bead wires B assume a comparatively narrow space to reduce the holding means 41. The bead wires B are exhausted in vertically hung or axially aligned positions from the forming device 2 and feed also in vertical hanging or axially aligned positions into the first, second and third treating devices 5, 6 and 7. Accordingly, the holding of the bead wires B by the finger 45 in the hung or axially aligned positions in the above manner eliminates any requirement of turning the poitions of the bead wires, so that any mechanism for changing the positions of the bead wires B is not needed, thereby enabling the entire apparatus to be small and simple in construction. The brackets 42, holding plate 43, finger 45 and spring 46 form the holding means 41 as a whole.

Referring back to FIG. 1, on the horizontal beam 10 in the proximity of the driving sprocket 34 is fixed a motor 51 whose output is transmitted through a reduction gear 52 to a sprocket 53. A chain 55 for transmitting the power is trained about the sprocket 53 and a sprocket 54 secured to the rotary shaft 33. The driven sprocket 32, driving sprocket 34, chain conveyor 35, motor 51, reduction gear 52, sprockets 53 and 54 and chain 55 form driving means 56 for moving the plurality of holding means 41 so as to pass immediately in front of each of the treating devices 5, 6 and 7 and stopping the holding means 41 at the immediate front of each of the treating devices. The control means for operating the driving means is known and does not constitute the present invention; it will not be explained in detail. Such control means is of course preferably electronic control means.

The driving means 56 intermittently drives the holding means 41 so that the holding means 41 moves in increments of a distance one half of the distance between the treating devices 5, 6 and 7. If the cycles of the forming, carrying-out and treating are able to be equal, the holding means may be stopped only in immediate front of the treating devices 5, 6 and 7. Moreover, the driving means may be constructed by a straight screw-threaded shaft and a motor for driving the shaft or a rack and a pinion. In this case, however, a return stroke constitutes an idle stroke, giving rise to a waste of time to lower its working efficiency. On the other hand, in this embodiment, the holding means 41 moves along a closed loop by the driving means 56 to eliminate such a waste of time so as to improve its working efficiency.

Figure 8:
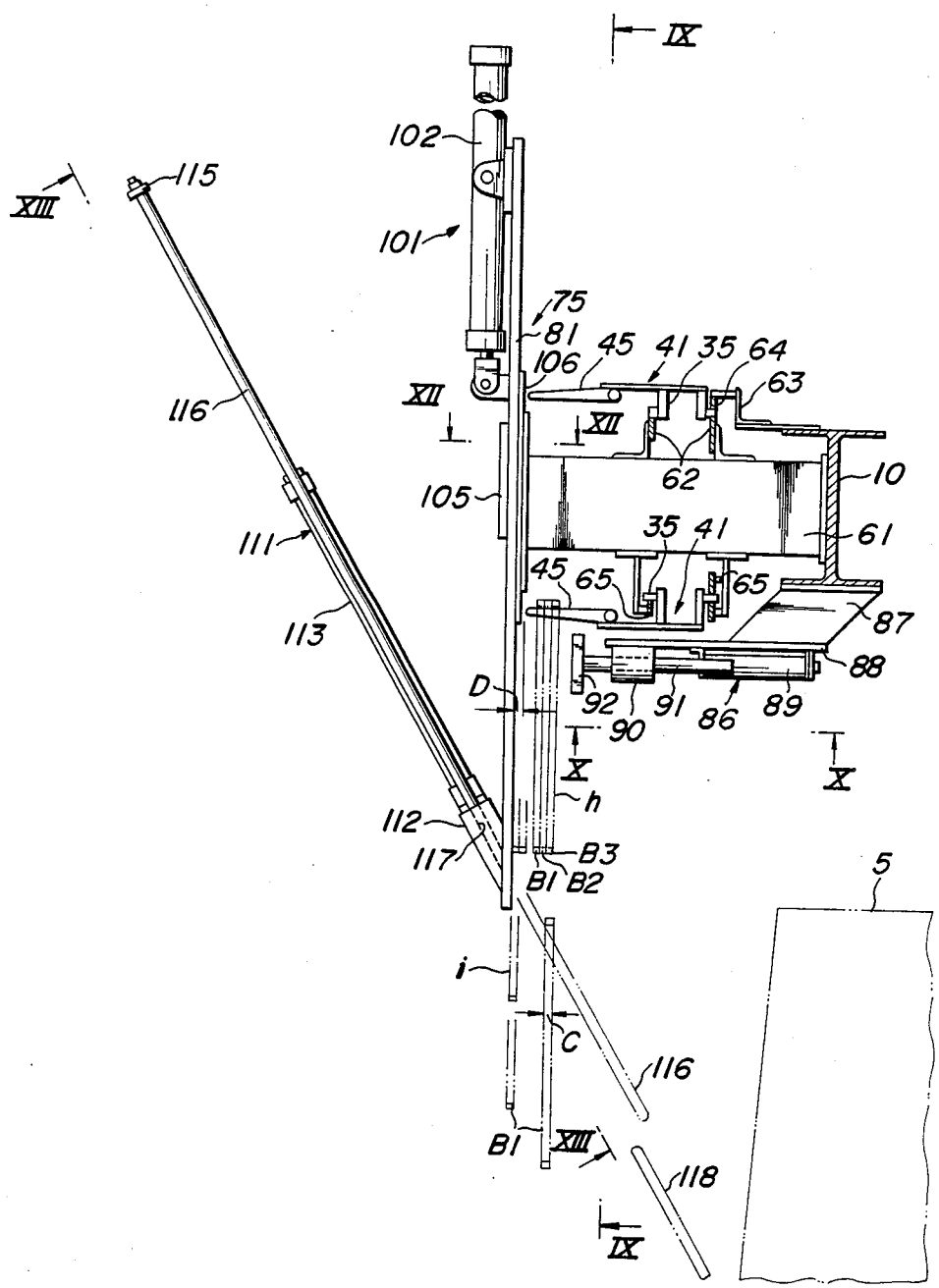
FIG. 8 is a sectional view of the apparatus taken along the line VIII—VIII in FIG. 1 illustrating the separating mechanism and passing-through mechanism used in the apparatus according to the invention.

Referring to FIGS. 1, 8 and 9, to a web of the horizontal beam 10 are attached pairs of horizontal support beams 61 located just above inlets of the first, second and third treating devices 5, 6 and 7. On upper surfaces of the support beams 61 are mounted guide rails 62 for guiding returning or upper runs of the chain conveyors 35 thereabove. Moreover, on the horizontal beam 10 are mounted through brackets 63 guide rails 64 for guiding the returning runs of the chain conveyors 35 thereabove. On the other hand, on lower surfaces of the support beams 61 are mounted guide rails 65 for guiding transferring or lower runs of the chain conveyors 35 thereabove and below.

Referring again to FIGS. 1, 2 and 3, to the horizontal beam 10 are secured a plurality of brackets 66 having at their ends a hindering rod 67 secured thereto extending in parallel with the horizontal beam 10 and just below the pivotal end of the finger 45 for preventing the bead wires B held by the finger 45 from removing therefrom onto the holding plate 43.

Referring to FIGS. 1, 2, 3 and 9, an arm 68 is secured to a side surface of the horizontal beam 10 just above the column 9. To the arm 68 and a lower surface of the support beam 61 are secured brackets 69 between which a plurality of horizontal pushing-back rods 70 extend. The horizontal pushing-back rods 70 are inclined to approach to the holding rods on the sides of the column 8 and are arranged in immediate front of free end of the finger 45 of the holding means 41 secured to the transferring runs of the chain coveyors 35. The reason why the pushing-back rods 70 are thus inclined is that the bead wires B pushed by a pushing mechanism later described toward the free end of the finger 45 are again returned to a predetermined position at a mid portion of the finger 45 to prevent them from removing therefrom.

Referring to FIGS. 1, 8 and 9, in immediate front of the respective treating devices are arranged transferring means 75, 76 and 77 for transferring the bead wires B one from the holding means 41 stopped in immediate front of the treating devices 5, 6 and 7 into the treating devices. Each of the transferring means 75, 76 and 77 has a vertical plate 81 as an abutment member fixed to a front end of the support beam 61 and located in immediate front of the finger 45. Each the vertical plate 81 is spaced from the free end of the finger 45 in its horizontal position a slight distance D slightly larger than a width C of one bead wire B. In more detail the distance D is larger than the width C but smaller than twice the width C. If the width C of the bead wire is changed to that of a different kind of bead wire, the securing position of the vertical plate 81 may be adjusted according to the width of the new bead wires.

As shown in FIGS. 8, 9, 10 and 11, just below each pair of support beams 61 is provided the pushing mechanism 86 having a horizontal plate 88 secured through a bracket 87 to the horizontal beam 10. To a lower surface of the horizontal plate 88 is secured a cylinder 89 in parallel with the support beam 61. To the lower surface of the horizontal plate 88 at both ends are secured a pair of guide blocks 90 respectively slidably supporting therein guide rods 91 in parallel with the cylinder 89. A pushing plate 92 in parallel with the vertical plate 81 is secured to front ends of the guide rods 91 and is provided at a center on the side of the guide rods 91 with a shaft 93 fixed thereto. The shaft 93 is formed with an axial blind hole or bottomed hole 94 in which a front end of a piston rod 95 of the cylinder 89 is slidably accommodated. The shaft 93 is further formed with axial elongated slots 96 communicating with the bottomed hole 94 and slidably receiving ends of a pin 97 secured to the front end of the piston rod 95. A compression spring 98 is interposed as a damper between the front end of the piston rod 95 and a bottom of the bottomed hole 94 for protecting the bead wires from being compressed by an excess force from the cylinder 89. The horizontal plate 88, cylinder 89, guide rods 91, pushing plate 92, shaft 93, pin 97 and spring 98 form the pushing mechanism 86 as a whole which pushes the bead wires B held by the finger 45 in the axial direction of the bead wires so as to abut against the vertical plate 81.

Figure 12:
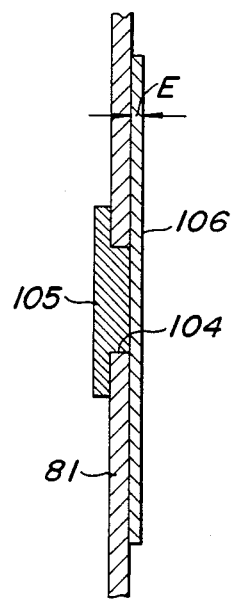
FIG. 12 is a sectional view of guide means of the separating mechanism taken along the line XII—XII in FIG. 8.

Referring to FIGS. 8, 9 and 12, each the vertical plate 81 is provided with a separating mechanism 101 comprising a vertical cylinder 102 mounted on an upper front surface of the vertical plate 81. The cylinder 102 is able to stop its piston rod 103 at any intermediate position in addition to stroke end positions. The vertical plate 81 is formed below the cylinder 102 with a vertically extending rectangular aperture 104 in which is slidably inserted a bottom portion of a slide guide 105 having a T-shaped cross-section. With a surface of the vertical plate 81 on the side of the chain conveyor 35 is slidably engaged a separating plate 106 fixed to the bottom portion of the slide guide 105. A thickness E of the separating plate 106 is substantially equal to the width C of the bead wire B. The front end of the piston rod 103 is connected to the separating plate 106, so that when the cylinder 102 is actuated, the slide guide 105 and separating plate 106 are moved guided by the rectangular aperture 104 along the surface of the vertical plate 81. The separating plate 106 is formed at its lower end with an arcuate notch 107 whose curvature is substantially equal to that of the outer circumference of the bead wire B.

The cylinder 102, slide guide 105 and separating plate 106 form the separating mechanism 101 as a whole for pushing the bead wire B removed from the free end of the finger 45 and abutting against the vertical plate 81 in a direction perpendicular to the axial direction of the bead wires B (in a vertically downward direction in this embodiment) to separate the bead wire from the bead wires held by the finger 45. Although the bead wire B is pushed downward by the separating mechanism 101 in this embodiment, the bead wire B may of course be pushed upward or laterally.

As above described, according to the invention the plurality of bead wires B held by the finger 45 are urged by the pushing mechanism 86 toward the vertical plate 81 spaced apart from the free end of the finger 45 a distance slightly larger than the width of the bead wire B so as to abut against the vertical plate 81 and thereafter the bead wire directly abutting against the vertical plate is pushed in the direction at right angles to the axial direction of the bead wires B so as to separate from the bead wires B still held by the finger 45. Therefore, even if raw rubber rings of the bead wires stick to each other, the bead wire abutting against the vertical plate 81 can be easily and securely separated from the other bead wires B without injuring the bead wires and without any detrimental deformation of the bead wire because the pushing force of the separating mechanism 101 acts in the direction at right angles to the axial direction of the bead wires, in which direction they have a high rigidity.

Figure 13:
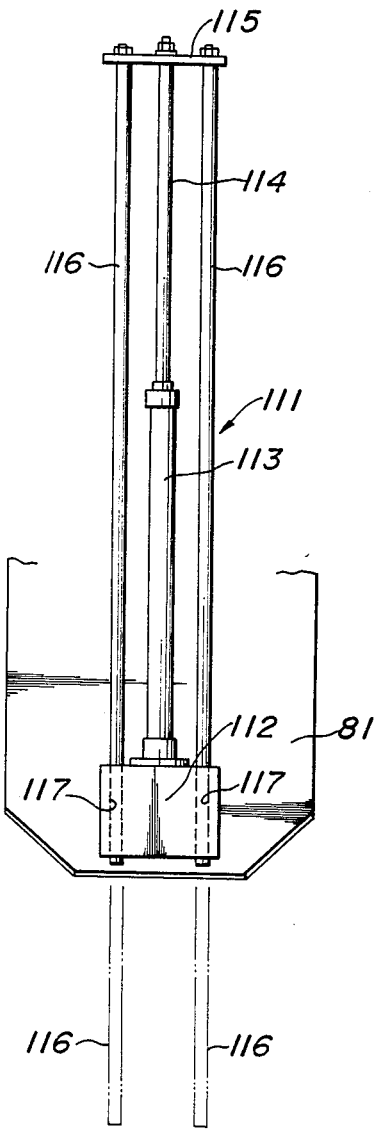
FIG. 13 is a front elevation of the passing-through mechanism as viewed in a direction shown by arrows XIII.

Referring to FIGS. 8, 9 and 13, each vertical plate 81 is provided at its lower end with a passing-through mechanism 111 having a mounting block 112 fixed to the lower front surface of the vertical plate 81. The mounting block 112 is provided with a cylinder which is inclined with its upper portion away from the vertical plate 81 and has a cylinder head fixed to the mounting block 112. A connecting plate 115 is fixed to an extending end of a piston rod 114 of the cylinder 113. On both sides of the cylinder 113 and in parallel therewith are provided guides 116 whose upper ends are fixed to the connecting plate 115. Lower end portions of the guides 116 are slidably inserted into through-holes 117 formed in the mounting block 112 and vertical plate 81. When the piston rod 114 is being retracted into the cylinder 113, the guides 116 are extending toward the inlet of the respective treating devices 5, 6 and 7 and simultaneously pass through inside of the bead wire B separated by the separating mechanism 101. As the result, the separated bead wire B is slidably guided by the guides 116 so as to fall downward to be transferred to a throwing-into rod 118 provided at each the inlet of the treating device 5, 6 and 7 in parallel with the guides 116.

The mounting block 112, cylinder 113, connecting plate 115 and guides 116 form as a whole the passing-through mechanism 111. The passing-through mechanism operates only to extend the guides 116 into the bead wire in order to supply the separated wire bead to each of the treating devices 5, 6 and 7, so that the operating time of the passing-through mechanism 111 is short and reliably operates without damaging the bead wires B.

The vertical plate (abutting member) 81, pushing mechanism 86, separating mechanism 101 and passing-through mechanism 111 form one transferring means 75, 76 and 77 as a whole. Although the fixed transferring means 75, 76 and 77 whose number is the same as that of the treating devices 5, 6 and 7, the transferring means may be secured to the respective holding means 41 so as to move together therewith.

The operation of the apparatus as one embodiment of the invention will be explained hereinafter.

A plurality (three in this embodiment) of bead wires $B_1$, $B_2$ and $B_3$ are simultaneously formed in the forming device 2 and exhausted onto the guide rods 3. After these bead wires $B_1$, $B_2$ and $B_3$ slide down on the guide rods 3 so as to abut against the releasing bars 4 to hang or depend from the guide rods 3 in their exhaust position a shown in phantom lines in FIGS. 1, 2 and 3. Then the pneumatic cylinder 16 is actuated to extend its piston rod 17 so as to lower the pair of fingers 22 into the lowermost position b shown in phantom lines in FIG. 2. On the way of this lowering movement, when the lower surfaces of the fingers 22 strike the bead wires $B_1$, $B_2$ and $B_3$, the upward rockable fingers 22 are urged by them to rock into the inclined position c shown in phantom lines in FIG. 2 to pass by the bead wires and then the fingers 22 return to their horizontal position with the aid of their self weights. The pneumatic cylinder 16 is then actuated so as to retract the piston rod 17 to raise the fingers 22 until they engage the bead wires $B_1$, $B_2$ and $B_3$. The fingers 22 are further moved upward to raise the bead wires, during which lower portions of the bead wires slidingly contact the releasing bars 4 to move progressively away from the forming device 2, so that the bead wires leave the guide rods 3 without any interference. At the moment, the bead wires incline at large angles with a vertical line, so that they rock or swing through large angles during their upward movement but they soon abut against the steady plates 24 and the hindering rods 67 so as to stop their rocking movements. The fingers 22 are further raised until the bead wires $B_1$, $B_2$ and $B_3$ abut against the finger 45 located directly above the guide rods 3, so that the finger 45 is urged upward by the raising bead wires so as to rock upward from its horizontal position d into its inclined position e shown in phantom lines in FIG. 2. As the result, the bead wires $B_1$, $B_2$ and $B_3$ pass by the finger 45 without any interference. By further retracting the piston rod 17 the fingers 22 and bead wires $B_1$, $B_2$ and $B_3$ arrive in the uppermost positions f and g shown in phantom lines in FIGS. 1, 2 and 3. Thereafter, the piston rod 17 extends again to lower the fingers 22, on which way the bead wires $B_1$, $B_2$ and $B_3$ are transferred in their concentrically aligned and hanging condition from the fingers 22 to the finger 45 which has already returned to the horizontal position d. In this manner, the bead wires $B_1$, $B_2$ and $B_3$ are transferred from the forming device 2 to the holding means 41 by the carrying-out mechanism 25.

The motor is then energized so as to drive the chain conveyors 35 to transfer the bead wires $B_1$, $B_2$ and $B_3$ under the hung condition to a transferring position h in immediate front of the first treating device 5, on which way the chain conveyors 35 are once stopped thereby to stop the finger at an intermediate position between the forming device 2 and the first treating device 5.

When the bead wires $B_1$, $B_2$ and $B_3$ arrive in the transferring position h, the cylinder 89 of the pushing mechanism 86 is actuated to extend its piston rod 95. As the result, the bead wires $B_1$, $B_2$ and $B_3$ are pushed in their axial direction to slide on the finger 45 until the bead wire $B_1$ abuts against the vertical plate 81. At the moment, only the bead wire $B_1$ to be supplied into the first treating device 5 will disengage from the free end of the finger 45 because the vertical plate 81 is spaced from the free end of the finger 45 a distance D slightly larger than the width C of one bead wire. However, the bead wire $B_1$ does not fall downward by its weight because it is forced against the vertical plate 81 by the pushing plate 92 and sticking to the next bead wire $B_2$.

Thereafter, the cylinder 89 is again actuated so as to retract its piston rod 95 to return the pushing plate 92 to the original position. The cylinder 102 is then actuated so as to extend its piston rod 103 into the intermediate position, so that the separating plate 106 is lowered along the surface of the vertical plate 81 to push downward only the bead wire $B_1$ in the direction at right angles to the axial direction of the bead wires into the intermediate position i shown in phantom lines in FIGS. 8 and 9 where a horizontal diameter of the bead wire $B_1$ is located in the proximity of front ends of the guides 116. At the time, moreover, the bead wire $B_1$ does not fall downward because the sticking force of the bead wire $B_1$ to the next bead wire $B_2$ is larger than the self weight of the bead wire $B_1$.

The cylinder 113 of the passing-through mechanism 111 is actuated to retract its piston rod 114 to insert the guides 116 into the bead wire $B_1$ stopped in the intermediate position i. Then the cylinder 102 of the separating mechanism 101 is again actuated to extend its piston rod 103 to its stroke end to push the bead wire $B_1$ by the separating plate 106, so that when the pushing force of the separating plate 106 overcomes the sticking force of the bead wire $B_1$, the bead wire $B_1$ is separated from the bead wire $B_2$ to fall downward slidingly contacting the vertical plate 81 onto the guides 116 which contact the inside of the bead wire $B_1$. Then the bead wire $B_1$ slides down on the guides 116 so as to be transferred onto the throwing-into rod 118 and into the first treating device 5 in which the bead wire $B_1$ is treated in a predetermined manner.

Thereafter, the cylinders 102 and 113 of the separating mechanism 101 and passing-through mechanism 111 are simultaneously actuated to return the separating plate 106 and guides 116 to their initial positions.

The motor 51 is then again energized to drive the chain conveyors 35 so that the two remaining tire beads $B_2$ and $B_3$ held by the finger 45 is transferred to the transferring position j in immediate front of the second treating device 6 on which way the finger 45 together with the two bead wires $B_2$ and $B_3$ once stops in an intermediate position in the same manner as in the bead wire $B_1$. During this transfer, the bead wires $B_2$ and $B_3$ are urged into a center portion of the finger 45 by the pushing-back rods 70 which are not parallel to the direction of the chain conveyors, so that the bead wires $B_2$ and $B_3$ do not fall downward although they have been pushed to the free end of the finger 45 by the pushing mechanism 86 as above described. After the bead wires $B_2$ and $B_3$ are transferred to the transferring position j, only the bead wire $B_2$ is transferred into the second treating means 6.

Furthermore, by driving again the chain conveyor 35 the remaining bead wire $B_3$ is transferred to and stopped in the transferring position k in immediate front of the third treating device 7 and thereafter the bead wire $B_3$ is transferred into the third treating device 7 in the same manner above described. The above has been explained for the operation of the apparatus referring to one of the holding means 41. The other holding means 41 operates in the same manner as the above and these holding means operate simultaneously.

As can be seen from the above description, the tire bead wire supply apparatus according to the invention comprises holding means for holding a plurality of bead wires, driving means for moving the holding means so as to pass in immediate front of each of the treating means in succession and stopping the holding means at the immediate front of each of the treating means and transferring means for receiving each of the bead wires from the holding means stopped at the immediate front of each of the treating means and transferring it to the each of said treating means, whereby the apparatus operates with high efficiency and is inexpensive and small-sized.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for supplying bead wires for tires one to each of a plurality of treating means for the bead wires, said apparatus comprising; holding means for holding a plurality of bead wires, driving means for moving said holding means so as to pass in immediate front of each of said treating means in succession and stopping said holding means at said immediate front of each of said treating means and transferring means for receiving each of said bead wires from said holding means stopped a the immediate front of each of said treating means and transferring it to said each of said treating means, wherein said transferring means comprises abutment means fixed to the apparatus and substantially vertically extending for guiding one of said bead wires lowering downward into said treating means and adjustable in relative position to said holding means depending upon a width of bead wires to be transferred, pushing means for pushing the bead wires held by said holding means until the bead wire nearest to said abutment means abuts thereagainst, separating means for pushing downward the bead wire directly abutting against said abutment means therealong, and passing-through means including guide means extensible into an inside of said bead wire pushed by said separating means to guide the bead wire into the treating device.

2. An apparatus as set forth in claim 1, wherein said holding means comprises a holding plate connected to moving part of said driving means, and a finger mounted on said holding plate in a manner rockable only upward from a horizontal position and normally resiliently held in the horizontal position.

3. An apparatus as set forth in claim 2, wherein said finger is pivotally mounted on said holding plate such that in said horizontal position an underside of said finger abuts against part of said holding plate so as to prevent a downward rocking movement of the finger and is normally held in the horizontal position by an action of a spring so as to permit the finger to rock upward when the finger is subjected to an upward directing force.

4. An apparatus as set forth in claim 1, wherein said driving means comprises a motor, reduction gear means, sprockets, at least one chain and control means.

5. An apparatus as set forth in claim 1, wherein said abutment means comprises a vertical plate having guide means for said separating means.

6. An apparatus as set forth in claim 1, wherein said pushing means comprises a pushing plate for urging the bead wires against the abutment means, pushing plate driving means for moving said pushing plate toward and away from the abutment means, pushing plate guiding means for guiding the pushing plate, and damper means between said pushing plate and said pushing plate driving means for protecting the bead wires from being compressed by an excess force from said pushing plate driving means.

7. An apparatus as set forth in claim 6, wherein said pushing plate driving means is a piston and cylinder assembly and said damper means is a compression spring.

8. An apparatus as set forth in claim 1, wherein said separating means comprises a separating plate having at its lower end an arcuate notch snugly engaging the bead wire directly abutting against said abutment means, separating plate driving means for moving said separating plate upward and downward, and separating plate guide means for guiding said separating plate.

9. An apparatus as set forth in claim 8, wherein said separating plate driving means is a piston and cylinder assembly and said separating plate guide means comprises a vertically extending rectangular aperture formed said abutment means and a slide guide having a T-shaped cross-section slidably fitted in said rectangular aperture of said abutment means and secured to said separating plate.

10. An apparatus as set forth in claim 1, wherein said guide means of said passing-through means comprises parallel guide rods which are moved by a piston-cylinder assembly whose head end is secured to a mounting block mounted on said abutment means, said parallel guide rods being guided in through-holes formed in said mounting block and said abutment means.

* * * * *